Patented Mar. 16, 1937

2,073,799

UNITED STATES PATENT OFFICE 2,073,799

PROCESS FOR THE PRODUCTION OF HYDROXY ACIDS AND THE PRODUCT THEREOF

Julian W. Hill, Wilmington, Del., assignor to E. I. du Pont de Nemours & Company, Wilmington, Del., a corporation of Delaware No Drawing. Application May 18, 1935
Serial No. 22,177

15 Claims. (Cl. 260—112)

This invention relates to polyesters and hydroxyacids and to a novel method for the preparation of hydroxyacids.

An object of this invention is to prepare new and useful hydroxyacids. Still another object is to convert polyanhydrides of dicarboxylic acids into hydroxyacids. A further object of this invention is to prepare long chain omega-hydroxyacids.

These objects are accomplished by hydrogenating a polyanhydride of a dicarboxylic acid to a polyester, hydrolyzing the polyester, and isolating the hydroxyacid from the products of the hydrolysis.

It has now been found that hydroxyacids can be prepared by a fairly simple process from polyanhydrides derived from dicarboxylic acids (for the most part, the dicarboxylic acids are readily available compounds). This process consists essentially of two steps: (1) the hydrogenation of the polyanhydride and (2) the hydrolysis of the resultant polyester. These steps may be represented by the following equations in which R represents a divalent organic radical. I wish to make it clear, however, that the exact formula of the mixed polyester is not known, so that this intermediate can be defined only in terms of its hydrolysis products.

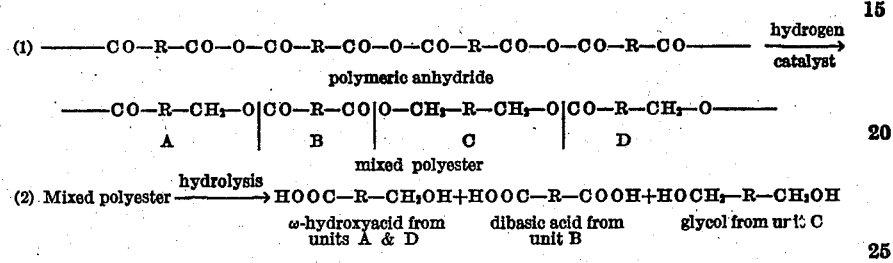

The polyanhydrides used in this invention are not new; they have been described in various publications, for example, those of Hill and Carothers (J. Am. Chem. Soc. 52, 4110 (1930); ibid. 54, 1569 (1932); ibid. 55, 5023 (1933)).

To the best of my knowledge, polyanhydrides have never been hydrogenated previously. The literature contains various references to the hydrogenation of monomeric anhydrides, such as phthalic anhydride, but makes no mention of polyanhydrides in this connection. The polyesters obtained by hydrogenating polyanhydrides are new. They are unique in that they yield hydroxyacid, glycol, and dicarboxylic acid on hydrolysis. Polyesters derived from the self-condensation of hydroxyacids yield only hydroxyacids on hydrolysis, whereas polyesters derived from the reaction of dibasic acids with glycols yield no hydroxyacid on hydrolysis but revert to the original dibasic acid and glycol.

The known methods for the preparation of hydroxyacids, other than the alpha-hydroxyacids, are so involved and give such poor yields that the cost of these products prohibits their use in industrial applications. This is especially true of the longer chain omega-hydroxyacids, that is, hydroxyacids in which the hydroxyl group is attached to the carbon farthest removed in the chain from the carboxyl group.

Step 1, the hydrogenation of the polyanhydride to the polyester, is carried out by dissolving the polyanhydride in a suitable inert solvent and treating with hydrogen in the presence of a hydrogenation catalyst. The temperature and pressure required are dependent upon the catalyst used and, to a lesser extent, upon the particular polyanhydride and solvent employed. For example, hydrogenation with a platinum black catalyst takes place at a lower temperature than with a copper chromite catalyst. Suitable solvents may be such non-polar compounds as hydrocarbons and ethers or compounds of a more polar character such as esters.

It is theoretically possible for the hydrogenation of the polyanhydride to take place in various ways, but my results show that the hydrogenation takes place in such fashion that a polyester is obtained which, on hydrolysis, yields a hydroxy acid, a glycol and a dibasic acid. This property of the polyester is unique and, so far as I am aware, is not found in any polyester heretofore disclosed.

The second step in the preparation of the hydroxyacid is the hydrolysis or saponification of the mixed polyester. The polyester is reacted with water in the presence of a basic or acidic catalyst. A satisfactory procedure is to heat the polyester at approximately 100° C. with a solution of an alkali, e. g., sodium hydroxide, in a mixture of water and alcohol until saponification is substantially complete. A few hours' heating is generally sufficient. The alcohol is removed by steam distillation and the glycol removed from the residue by ether extraction. The ether insoluble portion, which consists of the salts (sodium salts when sodium hydroxide is used in the saponification) of the hydroxyacid and the dicarboxylic acid, is acidified in order to liberate the free hydroxyacid and dibasic acid. The hydroxyacid generally comes to the top as an oil or waxy material and is thus separated and recovered. In some cases, the hydroxyacid and the dibasic acid can be separated in the form of their salts prior to treatment with acid, since the sodium salt of the hydroxyacid is generally less soluble in water than the dibasic acid salt.

The new method for the preparation of hydroxyacids is illustrated in the following examples:

Example 1

A hydrogenation catalyst was prepared as follows: Twenty-six grams of barium nitrate and 218 g. of cupric nitrate were dissolved in 800 cc. of warm water. A multiple chromate precipitate was formed by the addition with stirring of a solution prepared by dissolving 126 g. of ammonium bichromate in 600 cc. of water and adding 150 cc. of 28% ammonium hydroxide. The precipitate was washed, filtered, dried, ignited at 400° C., extracted with 10% acetic acid, and again washed and dried. A mixture of 96.5 grams of polymeric sebacic anhydride, $[CO(CH_2)_8COO]_x$, 150 grams of benzene, and 11.5 g. of the Cu—Ba—Cr catalyst described above was placed in a steel tube and subjected under constant agitation to hydrogen under 3300 lb. per sq. in. pressure at 250–260° C. Hydrogenation took place smoothly and was complete within seven hours. The benzene solution of the hydrogenated product was filtered to remove the catalyst and was then evaporated to dryness. The residue, amounting to 75 grams, was a soft waxy material (M. P. 37–40° C.), having a pleasant ester-like odor. Thirty grams of the residue was hydrolyzed by refluxing for three hours with a solution containing 15 grams of sodium hydroxide, 75 cc. of water, and 75 cc. of alcohol. The alcohol was removed by steam distillation, the residue was diluted with water to a volume of one liter, and extracted with ether for 18 hours. Evaporation of the ether extract gave 10 grams of decamethylene glycol, melting at 71–72° C. The aqueous solution from which the glycol had been removed by ether extraction was then acidified with 40 cc. of concentrated hydrochloric acid and heated to boiling. An oil came to the surface and solidified on cooling. This solid matter consisted largely of omega-hydroxydecanoic acid, $HO(CH_2)_9COOH$. After purification by several recrystallizations from water, 13.5 grams of omega-hydroxydecanoic acid, melting point 74–76° C., was obtained. The sebacic acid present in the hydrolysis mixture was not separated.

Example 2

A solution of 121.5 grams of brassylic anhydride polymer $[CO(CH_2)_{11}COO]_x$, in 120 cc. of thiophene-free benzene was placed in a steel tube with 12.2 grams of copper chromite catalyst and subjected to 3000 pounds hydrogen pressure at a temperature of 240–245° C. Hydrogen absorption continued for 315 hours, the hydrogen pressure dropping to 2500 lbs. per sq. in. The solution of hydrogenated product was filtered while hot and the filtrate evaporated to dryness on a steam bath. The reddish-colored syrupy residue, weighing 96.5 grams, was hydrolyzed by refluxing for several hours with a solution containing 80 grams sodium hydroxide, 300 cc. water, and 300 cc. of alcohol. The resultant solution was filtered and the filtrate steam distilled to remove the alcohol. On cooling the residue (4 liters) after the removal of the alcohol, a solid (A) separated and was removed by filtration. The filtrate on acidification gave 30 grams of brassylic acid which was purified by recrystallization from benzene after treatment with charcoal. The brassylic acid was identified by determination of its melting point and mixed melting point with pure acid prepared by another method; the melting point in each case was 105° C. Fraction A was continuously extracted with ether for two days. One and one-half grams of tridecamethylene glycol resulted on evaporation of the ether. The glycol melted at 72° C. and no depression of the melting point was observed when it was mixed with tridecamethylene glycol prepared by another method. The water layer on acidification gave 21 g. of an acid which melted at 77–78° C. after recrystallization from benzene. This acid proved to be omega-hydroxytridecanoic acid, $HO(CH_2)_{12}COOH$.

In the above examples, certain definite conditions of operation such as time, temperature, and pressure have been indicated, but these may be varied within wide limits within the scope of this invention. With the particular catalysts disclosed in the examples, the preferred temperature is in the range from 100 to 450° C., but temperatures above and below this may be used although not so efficiently. The preferred pressure for the process of the present invention lies within the range of 500 to 5000 lbs./sq. in., but pressures above and below this range may be employed although usually lower pressures decrease the efficiency of the operation. The time of reaction is determined by the rate at which hydrogen is absorbed which rate will vary depending upon the temperature, pressure, catalyst, and anhydride being hydrogenated. An excess of hydrogen is usually employed.

Although in the examples a liquid phase operation was disclosed and a catalyst of but one composition, the invention is not limited to these conditions. The catalysts most suitable for use according to the process of the present invention consist of a hydrogenating metal or a hydrogenating metal oxide associated with, combined with, or supported upon an acidic oxide of chromium, vanadium, molybdenum, tungsten, titanium, or uranium, preferably in a lower valence stage. The hydrogenating metals useful in the process include zinc, iron, nickel, cobalt, copper, cadmium, silver, and tin. The hydrogenating metal oxides include manganese and magnesium oxides. The catalysts and the method of their preparation described in U. S. Patent 1,964,000 are in general useful. They may be supported on kieselguhr, silica gel, pumice, etc. In the preferred embodiment of the invention a copper chromite catalyst is utilized, although successful hydrogenations may be carried out using chromites of other metals. Other catalysts useful in the hydrogenation of monomeric anhydrides, e. g., platinum black, may also be used.

In the examples, benzene is disclosed as the solvent, but other solvents may be employed. It is also permissible to carry out the hydrogenation in the presence of a diluent. When employing catalysts of the chromite type, such as copper and nickel chromites, aromatic and hydroaromatic solvents are preferred. As examples of other solvents which may be used, I would mention toluene, xylene, cyclohexane, methyl cyclohexane, and dimethyl cyclohexane. The process may be operated, although in general not so efficiently, without the use of solvents. Because of the greater efficiency of the process using solvents this presents a preferred phase of the invention. The process may be operated either as a batch or a continuous process.

The examples disclose the hydrogenation of polyanhydrides of sebacic and brassylic acids, but other polyanhydrides may be hydrogenated in a similar fashion, to give mixed polyesters which may be hydrolyzed to give hydroxy acids, glycol and dibasic acid. The polyanhydrides may be represented by the general formula $$(-CO-R-CO-O-)_x$$

in which R represents a divalent organic radical and $x$ indicates that the product is polymeric. As examples of other anhydrides which may be used in this invention, I would mention the polyanhydrides of the following acids: adipic, pimelic, suberic, azelaic, undecanedioic, dodecanedioic, tetradecanedioic, and octadecanedioic.

No simple general formula for the polyesters formed on hydrogenation of the polyanhydrides can be given. They are best described as polyesters which yield on hydrolysis hydroxyacid, glycol, and dicarboxylic acid.

In the examples, the polyesters are hydrolyzed by heating with a solution of sodium hydroxide in water and alcohol. Other alkalies may be used, for example, potassium hydroxide, lithium hydroxide, sodium carbonate, calcium hydroxide, etc. The alcohol may be omitted or other alcohols besides ethyl alcohol may be employed. The hydrolysis can also be effected with acidic catalysts, such as hydrochloric acid, but this is not the preferred procedure.

The hydroxyacids formed on hydrogenation of the polyanhydrides, $(-CO-R-CO-O-)_x$ followed by hydrolysis of the resultant polyesters have the general formula $$HO-CH_2-R-COOH$$

in which R represents a divalent organic radical. For example, polyadipic anhydride, $$(-CO-(CH_2)_4-CO-O-)_x$$

when treated in this way yields omega-hydroxycaproic acid, $HO(CH_2)_5COOH$; polypimelic anhydride, $(-CO-(CH_2)_5-CO-O-)_x$, yields omega-hydroxyheptylic acid, $HO(CH_2)_6COOH$, etc. It is not necessary that the divalent organic radical R be a straight chain radical as in the preceding examples. It may be a branched chain; for example, the polymer of α-methyl adipic anhydride,

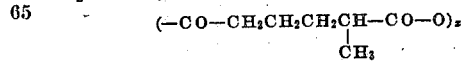

yields alpha-methyl-omega-hydroxycaproic acid,

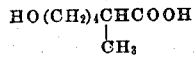

when treated by the methods of this invention.

This invention provides a convenient method for the preparation of hydroxyacids, as well as of novel polyesters. The raw materials, namely, the polymeric polyanhydrides, are readily prepared from the corresponding dicarboxylic acids. The two steps in the conversion of the polyanhydride to the hydroxyacid are simple and do not require expensive equipment or chemicals. The hydroxyacids are useful in the preparation of polyesters and other linear polymers which may be converted into fibers. The hydroxyacids are also useful in the preparation of macrocyclic lactones which are of value as perfume ingredients.

The mixed polyesters formed as intermediates in the preparation of the hydroxyacids may be used in coating and impregnating compositions and as modifying agents for resins.

The above description and examples are to be taken as illustrative only and not as limiting the scope of the invention. Any modification or variations therefrom which conform to the spirit of the invention are intended to be included within the scope of the claims.

I claim:

1. The process of producing a hydroxy acid from a polymeric anhydride of the general formula $(-CO-R-CO-O-)_x$, where "R" is an alkylene radical and "$x$" indicates a polymer, which comprises catalytically hydrogenating at a pressure of at least about 500 pounds per square inch said polymeric anhydride to a polyester and then hydrolyzing said polyester and recovering the hydroxy acid.

2. The process of producing a hydroxy acid which comprises hydrolyzing a polyester obtainable by the catalytic hydrogenation at a pressure of at least about 500 pounds per square inch of a polymeric anhydride of the general formula $(-CO-R-CO-O-)_x$, where "R" is an alkylene radical and "$x$" indicates a polymer.

3. The process in accordance with claim 2, characterized in that the hydrolysis is carried out by heating the polyesters in an alkali solution.

4. The process in accordance with claim 2, characterized in that the hydrolysis is carried out by heating the polyesters in a solution of sodium hydroxide in water and alcohol.

5. The process in accordance with claim 2, characterized in that the polymeric anhydride is a polymeric sebacic anhydride.

6. The process of producing a polyester which comprises catalytically hydrogenating at a pressure of at least about 500 pounds per square inch a polymeric anhydride of the general formula $(-CO-R-CO-O-)_x$, where "R" is an alkylene radical and "$x$" indicates a polymer.

7. The process in accordance with claim 6, characterized in that the polymeric anhydride is a polymeric sebacic anhydride.

8. The process in accordance with claim 6, characterized in that the hydrogenation reaction is carried out in the presence of a solvent.

9. The process in accordance with claim 6, characterized in that the hydrogenation reaction is carried out in the presence of benzene.

10. The process in accordance with claim 6 characterized in that the reaction is carried out at a pressure of about 3000 pounds per square inch to about 3300 pounds per square inch.

11. A process which comprises catalytically hydrogenating a polymeric sebacic anhydride in the presence of a mixture of the chromites of copper and barium at a temperature of about 250° to about 260° C. and under a hydrogen pressure of about 3300 pounds per square inch while dissolved in benzene, separating the polyesters obtained and heating same in a water-alcohol solution of sodium hydroxide to hydrolyze them, and recovering the products of hydrolysis.

12. A process which comprises catalytically hydrogenating a polymeric brassylic anhydride in the presence of a copper chromite catalyst at a temperature of about 240° to about 245° C. and at a hydrogen pressure of about 3000 pounds per square inch while in solution in benzene, heating the resulting polyesters in an alcohol-water solution of sodium hydroxide so as to hydrolyze same, and recovering the products of hydrolysis.

13. A polyester obtainable by the catalytic hydrogenation at a pressure of at least about 500 pounds per square inch of a polyanhydride of the general formula $(-CO-R-CO-O-)_x$, where "R" is an alkylene radical and "$x$" indicates a polymer.

14. A polyester obtainable by the catalytic hydrogenation of a polymeric sebacic anhydride at a pressure of at least about 500 pounds per square inch.

15. The process of producing polyesters hydrolyzable to hydroxy acids from a polymeric anhydride of the general formula
$$(-CO-R-CO-O-)_x,$$
where "R" is an alkylene radical and "$x$" indicates a polymer, which comprises catalytically hydrogenating at a pressure of at least about 500 pounds per square inch said polymeric anhydride to a polyester.

JULIAN W. HILL.